Patented Mar. 11, 1930

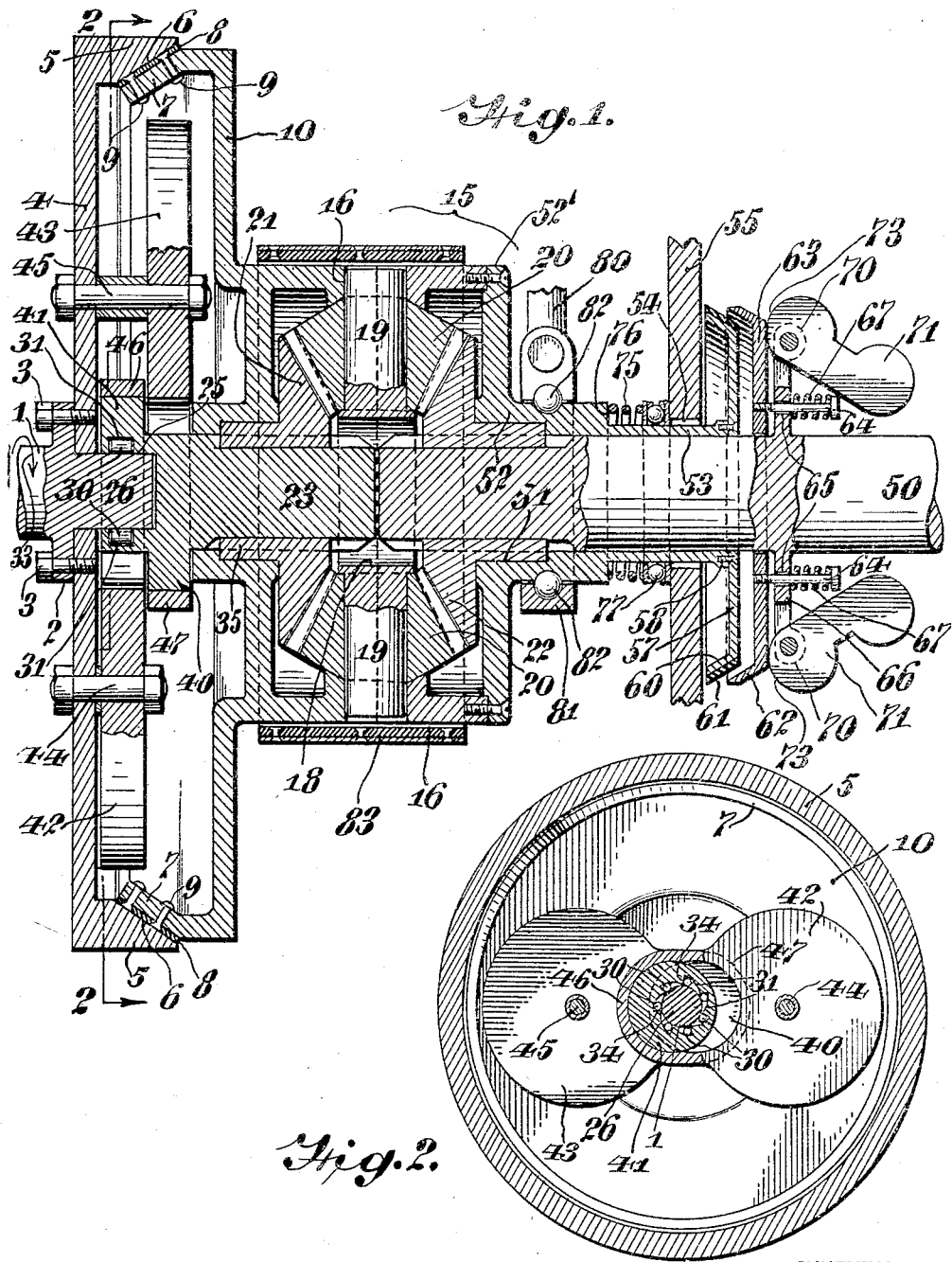

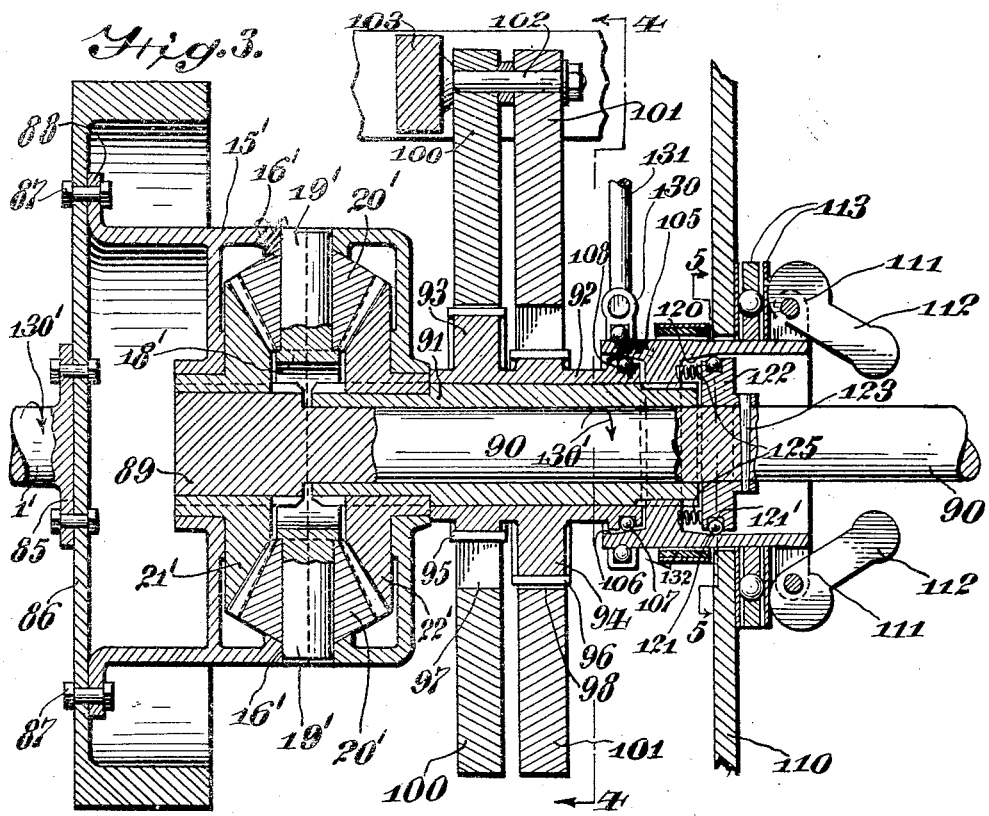
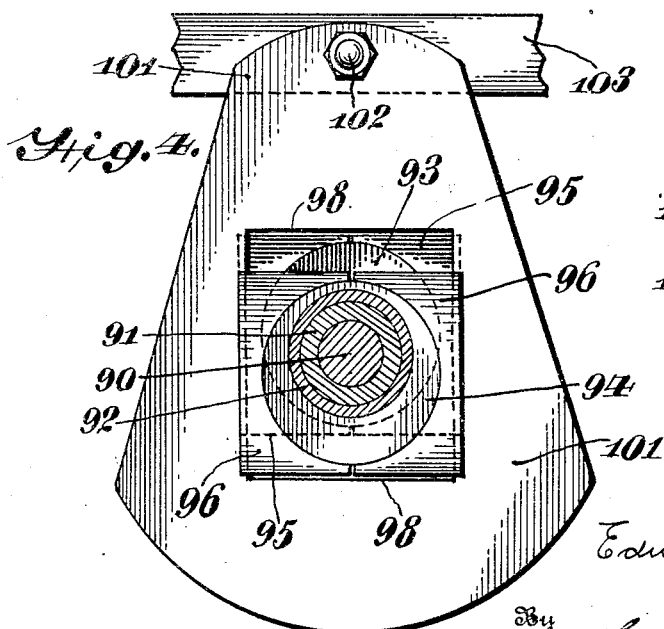
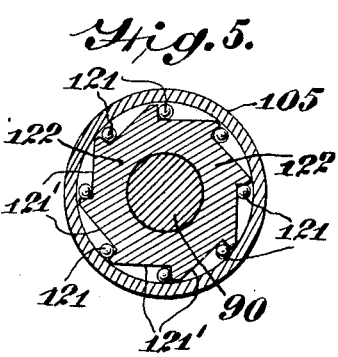

1,749,889

UNITED STATES PATENT OFFICE

EDWARD C. REID, OF PHILADELPHIA, PENNSYLVANIA

DIFFERENTIAL TRANSMISSION MECHANISM

Application filed June 12, 1928. Serial No. 284,785.

My invention relates to differential transmission mechanism or means by means of which power is adapted to be transmitted from one member to another, as for instance, a prime mover to a member to be driven. Mechanism or means embodying my invention is particularly well adapted for the transmission of power manifested by movement from the crank shaft of an engine to a shaft to be driven thereby.

The general object of the invention is to provide a mechanism or means including differential transmission mechanism and also including means whereby the power and the movement to be transmitted through the transmission mechanism are adapted to be controlled in novel manner.

It also is an object of the invention to provide novel means interposed between the driving member, as an engine crank shaft, and the differential gearing of a power transmission mechanism for operating and driving the said mechanism.

A further object of the invention is to provide means of novel structure including weights interposed between a driving member (as the crank shaft of an engine) and the member to be driven, whereby power may be transmitted economically and efficiently from the said driving to the said driven member.

To these and other ends the invention comprehends the construction and arrangement of parts as hereinafter described in detail, particularly pointed out in the claims and as depicted in the drawing in which I have illustrated one form of mechanical embodiment of the invention. However, it is to be understood that the invention is susceptible of embodiment in other forms of construction than that shown and that the principle involved in the invention is susceptible of application through mechanism which may differ in substantial manner from that disclosed. In order that the invention may be more readily understood reference should be had to the accompanying drawing wherein Fig. 1 is a view in longitudinal sectional elevation of a mechanism or means embodying the invention;

Fig. 2 is a transverse sectional view taken on the line 2—2 of Fig. 1, the dimensions of the parts illustrated in Fig. 2 being reduced as compared with Fig. 1;

Fig. 3 is a view in longitudinal sectional elevation of a mechanism or means embodying a modified construction of the invention;

Fig. 4 is a view in transverse sectional elevation taken on the line 4—4 of Fig. 3; and Fig. 5 is a transverse sectional view taken on the line 5—5 of Fig. 3.

In Figs. 1 and 2 of the drawings I have shown at 1 an end portion of an engine crank shaft which is provided with an integral flange 2 which is connected by means of screw bolts 3 with a plate 4 provided with a rim 5 at its outer edge, the said plate and rim constituting a driving fly wheel. The rim 5 is in the form of a flange extending laterally as shown, and its inner rear edge portion is beveled, as indicated at 6, and constitutes one member or element of a cone clutch as indicated. The other member of the cone clutch is indicated at 7, said member being provided with a friction bearing lining 8 secured thereto by means of rivets 9. The member 7 of the cone clutch structure consists of a part of a flange which extends forwardly from the outer edge portion of the annular flange 10 which is provided upon the forward edge portion of the differential gear casing 15. The said casing is provided with openings 16 at intervals in the outer cylindrical wall thereof, as indicated. In the construction illustrated there are four of these openings arranged in ninety degree relation to each other with respect to the axis of the shaft 1 and of the casing.

Mounted within the casing 15 and concentrically thereof is a spider 18 having four radially extending projections 19 which project into the openings 16. Bevel gears 20 are mounted on these projections and are in engagement with oppositely disposed bevel gears 21 and 22, as shown and in known manner. The bevel gear 21 is mounted upon the outer or rear end portion of a short intermediate section of shaft 23, the hub of said gear 21 having splined connection with the said shaft, as shown. The relatively short section of shaft 23 is provided at its front end with an opening 25 extending thereinto and longitudinally or axially thereof into which a reduced rear end portion 26 of the crank shaft 1 projects. The reduced end portion 26 is adapted to be connected with the section of shaft 23 and to become interlocked therewith by means of rollers 30 mounted in tapered notches 31 provided in the side of the cylindrical opening 25. These notches are tapered in a direction corresponding to the direction of rotation of the shaft 1, which is in clockwise direction, as indicated by the arrow at 33. Each of these notches terminates at one end in a shoulder, as indicated at 34. The hub portion of the gear 21 is provided with a flange extension as indicated at 35 which is mounted in a bearing provided in the front wall of the casing 15. It will be noted that the rear end of the short shaft section 23 terminates in a plane in adjoining relation to a plane located medially of the casing and of the spider 18.

The forward end portion of the relatively short shaft section 23 is provided with eccentric portions 40 and 41 which preferably are formed integrally therewith, as shown. These eccentric portions are located in adjoining relation to each other and in parallel planes. The high points thereof project in opposite directions; that is to say, the said eccentrics are oppositely disposed with respect to the axis of the said shaft 23. These eccentrics are adapted to actuate inertia devices or weights 42 and 43 to cause oscillation thereof which devices or weights are mounted respectively upon pivot bolts 44 and 45 carried by the plate 4. These weights are provided with projecting portions 46 and 47 each of which has an oval opening as shown in which openings are located the eccentric portions of the shaft 23, 40 and 41. The purpose of the eccentrics and of the weights 42 and 43 which are adapted to be pivotally actuated thereby will be referred to hereinafter and pointed out specifically.

The gear 22, to which reference has been made previously, has splined connection with the front end portion of a shaft 50 which is adapted to be driven by the mechanism interposed between the front end portion thereof and the rear end portion of the crank shaft 1. It will be noted that the front end of the shaft 50 terminates in adjoining relation to the rear end of the short shaft section 23.

The hub of the gear 22 is provided with a flange which projects into and is supported by a bearing at 51 formed in a tubular portion 52 which extends rearwardly from the end plate 52' which constitutes one end portion of the casing 15. The said tubular portion 52 terminates in a reduced tubular extension 53 which extends through an opening 54 provided in a stationary plate or wall 55. A plate member 57 is secured by fastening screws 58 to the rear end of the tubular extension 53. The outer edge of the plate 57 is provided with a flange 60 of truncated cone shape formation which is provided with a friction covering 61, as shown. The said truncated cone shaped flange is adapted to be engaged with and disengaged from the inner side of a correspondingly shaped flange 62 formed upon the outer edge of a plate 63 supported upon the forward ends of pins 64 which are mounted to move longitudinally of their lengths in openings 65 located at intervals in a flange 66 which is integral with the shaft 50. The rear ends of the pins 64 terminate in heads and between the said heads and the flange 66 springs 67 are located which by reason of being under tension tend to hold the plate 63 rearwardly and in contact with the flange 66. The flange 66 is provided in oppositely disposed relation to each other with radially projecting pairs of ears 70 between each of which pair a weight 71 is pivotally mounted. These weights are pivoted respectively near their forward ends between the ears of the respective pairs of ears. The forward end portions of the said weights project beyond the said ears and are curved to form cam acting portions 73 which are adapted to contact with the plate 63 and force it forwardly with relation to the shaft 50 and in opposition to the force exerted by the springs 67. The weights are adapted to act upon and to cause movement of the said plate 63 toward the front or to the left, having reference to Fig. 1, when the shaft is rotated at a speed such as will generate a centrifugal force sufficient to cause outward movement of the rear end portions of the said weights 71 about the pivots by which they are connected to the ears 70. When movement of the plate 63 forwardly is effected the cone clutch 62 thereof is moved into engagement with the corresponding portion of the plate 57 so that the said plate 57 together with the parts connected therewith are interlocked and connected together. Such interlocking effects an interlocking or connection of the said plate 57 with the shaft 50 so that the casing 15 and parts carried thereby are thus connected with the shaft 50. A spring 75 is coiled around the tubular extension 53 and bears at one end against a shoulder 76 intermediate the portions 52 and 53 and at its opposite end against a ball bearing structure 77 seated against the adjoining side of the plate or wall 55.

For the purpose of shifting the casing 15 and the parts carried thereby longitudinally of the shafts 23 and 50 I have provided a shift lever 80 the outer end of which (not shown) is located in convenient position. The said lever is connected to a split ring 81 mounted upon the tubular portion 52 previously referred to and between which ring and the said portion ball bearings 82 are provided.

A brake band is shown at 83 which is adapted to clamp and hold the casing 15 against rotation should it be desired to so hold the latter.

Normally in the operation of the device the members 7 and 8 of the cone clutch are in engagement with each other so that rotation of the plate 4, which is carried by the shaft 1, causes rotation of the casing 15 and the parts carried thereby. Such rotation causes rotation of the spider 18 and owing to the fact that rotation of the gear 22, with which the gears 20 are in engagement, is resisted by the weight or load to be moved it follows that initially the gears 20 are not only carried bodily or revolubly about the axis of the shaft 50 but they are also rotated individually about the axes of the projections 19. Such rotation is in anti-clockwise direction and effects or causes rotation of the gear 21 at twice the speed of rotation of the shaft 1. The gear 21 is splined to the shaft section 23 so that rotation of the latter at the same speed as the gear 21 is effected. This rotation being at greater speed than that of the rotation of the shaft 1 it follows that the eccentrics 40 and 41 thereon effect oscillations of the weights 42 and 43. As the speed of rotation of the shaft 23 increases the resistance offered by the weights 42 and 43, due to their inertia, reacts through the shaft section 23 and the gears 20 upon the gear 22 to rotate the latter together with the shaft 50 with which it has splined connection. When the speed of the latter has reached a certain point the weights 71, due to centrifugal force, are swung about their pivots and their forward ends act upon the plate 63 to engage the cone clutch portions 60 and 62 referred to. When this occurs it will be noted that the casing, gears 20, the shaft section 23, and the shaft 50 rotate together as a single unit. It will be noted that in this operation the initial movement or rotation of the shaft 50 is effected by the reaction forces between the weights 42 and 43 and the eccentrics 40 and 41, the force thus resulting acting in the manner and through the means described to effect rotation of the shaft 50, which is the element or member to be driven. If the device is to be employed as the transmission mechanism of an automobile structure it will be understood that the rear end of the shaft 50 is connected in known manner to the rear axle structure of an automobile.

In the operation as described it will be noted that the shaft 1, the shaft section 23, and the shaft 50 all rotate in the same direction.

If it be desired to employ the mechanism for effecting reverse rotation of the shaft 50 the casing 15 should be shifted in order to disengage the clutch members 7 and 8. The brake 83 should then be applied to the periphery of the casing 15 to hold the same against rotation. That having been done it will be apparent that rotation of the shaft 1, the shaft 23 being stationary, will cause the rollers 30 to roll into position in the notches in which they are located to lock the reduced end portion 26 of the shaft 1 to the shaft 23. This having occurred, the shaft 23 is rotated with the shaft 1 and rotation thereof (the casing 15 being held against rotation) causes rotation of the gears 20 in an anti-clockwise direction about the projections 19. Such rotation causes rotation of the gear 22 together with the shaft 50 in an anti-clockwise direction or in reverse direction. By this means if the device is employed in the transmission mechanism of an automobile structure reverse or backward movement of the automobile is effected.

As has been suggested already, the principle underlying the construction and operation of the device as illustrated in Figs. 1 and 2 may be embodied in other forms of construction wherein the weights 41 and 42 or their equivalents may be associated with some other moving or movable part of the structure, and in Figs. 3 to 5 of the drawings I have illustrated one form of modified construction which now will be described.

In these figures of the drawings I have shown one end portion of an engine crank shaft 1' which terminates at its rear end in a flange 85 which is connected by means of bolts to a fly-wheel 86 to which in turn is connected a casing 15' by means of bolts 87 which engage a flange 88 upon the said casing. The casing is provided with openings 16' in its outer wall, of which openings there are four. They are arranged in ninety degree angular relation to each other about the axis of the casing. Mounted within the casing is a spider 18' which is provided with four radially extending projections 19' the outer ends of which project into the openings 16'. Bevel gears 20' are rotatably mounted upon these projections which gears are in engagement with bevel gears 21' and 22' which are located on opposite sides thereof and on opposite sides of the spider 18'. The bevel gear 21' is mounted upon and has splined connection with an elongated sleeve-like member 91 which is rotatably mounted upon the shaft 90. The member 91 constitutes in effect a tubular shaft section. A relatively short tubular member 92 is mounted upon the tubular sleeve section 91 and may either rotate therewith or there may be relative rotation between the two. The sleeve portion 92 is provided with eccentrics 93 and 94 the high portions of which are located in diametrically opposed relation to each other. Mounted upon these eccentric portions are portions 95 and 96 of square or rectangular shape, which portions are fitted or located within openings 97 and 98 provided in weights 100 and 101 both of which are suspended from a pin 102 which projects rearwardly from a stationary transverse bar 103 constituting a part of the frame of the chassis of an automobile or other structure. The portions 95 and 96 may be regarded as bearing portions and the rotary movement of the eccentrics upon which they are mounted causes sliding movement thereof in the openings 97 and 98. Rotation of the eccentrics causes oscillation of the weights 100 and 101 about the pivot pin 102, and said oscillations taking place simultaneously but in opposite directions.

What may be described as a clutch member 105 is mounted upon the rear end of the tubular sleeve or shaft section 91 and has splined connection therewith as shown. The inner surface of the annular projecting portion of the member 105 is beveled or flared outwardly as indicated at 106 and is adapted to engage balls 107 mounted in notches 108 in the rear end of the relatively short tubular member 92 previously referred to, which notches are of the character of those shown in Fig. 5, to be hereinafter described. The rear hollow or tubular end portion of the member 105 projects rearwardly through an opening in a stationary cross-wise extending member 110 and is provided at its rear end with two pairs of projections 111 which extend radially with respect to the axis of the said member 105. These two pairs of projections are located in diametrically opposed relation to each other as shown in Fig. 3 of the drawings. Weights 112 are pivotally mounted between the lugs of these respective pairs and their inner or front ends are enlarged and extend beyond the said projections and are rounded as indicated, and are adapted to contact with the adjoining side of an annular cam member 113 which is mounted upon the stationary cross-wise extending member 110. A portion of the inner side of the rearwardly extending hollow portion of the member 105 is beveled or flared outwardly as indicated at 120, which beveled portion is adapted to engage balls or similar devices 121 mounted in notches 121′ provided in the periphery of the annular member 122 secured by means of a pin 123 to the shaft 90. The member 122 if desired may be formed integrally with the said shaft. The location of the balls 121 in the notches constitutes means whereby the member 105 may be locked to the member 122 and the shaft 90 upon which the latter is mounted to rotate therewith. Springs 125 located between the member 122 and an intermediate web-like portion of the member 105 tend to hold the latter forwardly or in position to cause the flared portion 106 thereof to engage the balls 107.

For the purpose of adjusting the member 105 in either direction so that it may be caused to occupy a neutral or any other position desired, I have provided a shift ring 130 which is adapted to be actuated by means of a shift lever 131 which may be extended to a position where it may be conveniently operated.

In the operation of the device it will be understood that when the crank shaft 1′ is rotated toward the right, as indicated by the arrow at 130′, like rotation is imparted to the casing 15′ which causes revolution of the gears 20′ bodily around the axis of the structure. These gears are in mesh with the bevel gear 21′ which is mounted upon the shaft 90 which is to be driven. The gear 21′ being mounted on the shaft 90, it follows that it offers a load or resistance to be overcome. In consequence, the gears 20′ are caused to rotate about the projections 19′ in a clockwise direction to cause a corresponding rotation of the gear 22′ at a rate of speed twice that of the casing 15′. Rotation of the gear 22′ causes rotation of the tubular section or shaft 91. If the member 105 occupies the position in which it is shown in Fig. 3 of the drawings, with the outwardly flared surface 106 thereof in contact or engagement with the clutch balls 107, the member 92 will be driven and caused to rotate. Rotation thereof causes oscillation of the suspended weights 100 and 101. In overcoming the inertia of these weights a force due to the reaction thereof upon the eccentrics 93 and 94 resists and tends to prevent rotation of the said member 92 which is transmitted back through the gear 22′ to the gears 20′. When the rotation of the member 91 as heretofore described has finally reached a certain speed dependent upon the weight of the members 100 and 101 the resistance offered by the latter will be greater than that offered by the load to be overcome through the shaft 90 which is to be driven, in consequence of which the gear 21′ together with the shaft 90 will be driven or rotated in the direction indicated by the arrow 130′.

Rotation of the member 105 tends to cause outward pivotal movement of the weights 112. Such outward movement of these weights operates in the manner already indicated to cause rearward movement of the member 105 to effect engagement of the flared portion 120 thereof with the clutch balls 121. When such engagement is effected the shaft 1′, casing 15′, gears 21′, 22′ and the tubular sleeve section or shaft 91, are all connected together so as to rotate as a single unit. The speed of rotation of the shaft 90, when such connection is effected, is the same as that of the shaft 1′.

If it be desired, the member 105 may be adjusted to neutral position or out of engagement with either the clutch balls 107 or 121 and held against rotation in such position by means of the brake band 132. When so held it follows that the tubular sleeve or shaft section 91 and the gear 22' having splined connection therewith are also held against rotation. If when these parts are held against rotation the engine crank shaft 1' is rotated it follows that rotation is imparted to the shaft 90 at twice the speed of rotation of the said shaft 1'. That will be apparent when it is recalled that the gear 22' is held against rotation and that the bevel gears 20' are carried by the casing 15' bodily around the axis of the structure, that rotation thereof individually is effected and that it is such rotation that causes, by means of the bevel gear 21', rotation of the shaft 90.

From the foregoing it will be seen that I have provided transmission mechanism or means of simple construction by the employment of which power may be transmitted from a prime mover or driving shaft, as in the construction shown, to a shaft or other member or device to be moved or operated.

Having thus described my invention, what I claim and desire to secure by Letters Patent is:

1. The combination of a driving member, a member to be driven, power transmission means interposed between the two, the said means including an element rotatable relatively to the said members, means including members oscillatable by the rotation of said element whereby relative rotation of said element is adapted to create a reactive force to impose a force upon the member to be driven to drive the same, and means for locking the driving and driven members together to cause them to rotate together as a unit.

2. The combination of a prime mover, a member to be driven, power transmission means interposed between the said prime mover and the said member, the said means including an element which is relatively rotatable with respect to the said prime mover and the said member, and devices which are adapted to be actuated by the said rotatable element, the actuation of said devices creating a force of reaction varying in degree with the speed of rotation of the said element, which force acts through the said element to drive the said member, and means for automatically locking the prime mover and the member to be driven together when the latter has attained a predetermined speed of revolution.

3. The combination of a rotating driving member, a member to be rotatably driven, power transmission means interposed between the said rotating driving member and the said member to be driven, the said means including an element rotatable relatively to each of said members, pivotally supported devices adapted to be pivotally actuated by the rotation of said element to produce a force of reaction, means whereby the said reactive force may cause rotation of the member to be driven, and means acting automatically to connect the said driven member to said driving member whereby the said members rotate as a unit.

4. The combination of a prime mover, a member to be driven thereby, power transmission means interposed between the said prime mover and the said member, the said means including a relatively rotatable member, movable resistance members, means whereby movement of said members alternately in opposite directions is adapted to be effected by the said relatively rotatable element whereby resistance to the rotation of said element is effected by the said resistance members, such resistance varying automatically with the speed of the said element, means whereby the force of resistance offered by the said resistance members to the said element is transmitted to the member to be driven to drive the same, and means acting automatically at a predetermined speed of revolution of the driven member to lock the latter with the prime mover so that both rotate together as a unit.

5. The combination of a rotatable driving shaft, a shaft to be rotatably driven, a transmission casing, means for connecting the said casing to the said driving shaft, an element rotatable relatively to the said driving shaft and the shaft to be driven, means whereby the said relatively rotatable element is driven in the same direction as and at a greater speed than the said driving shaft is driven, pivoted resistance devices, stationary supports for said resistance devices, means whereby rotation of the said element relatively to the said driving shaft causes oscillation of the said resistance devices, the said resistance devices offering resistance to the rotation of the said relatively rotatable element, and means whereby the reactive resistance force is transmitted through the said element to the shaft to be driven.

6. Power transmission mechanism of the character described, comprising a driving member, a member to be driven, inertia means, differential mechanism interposed between the driving member, the driven member and the said inertia means for operating the latter and for transmitting the resistance offered thereby to the member to be driven, and means acting automatically to connect the said driven member to the said driving member whereby the said members rotate as a unit.

7. Power transmission mechanism of the character described, comprising a driving member, a member to be driven, interia means, differential mechanism having connection with the said driving member and with the said member to be driven, means interposed between the said differential mechanism and the said inertia means for causing movement of the latter and for transmitting the force of resistance of said inertia means back through the differential mechanism to the driven member to effect driving of the latter, and means acting automatically to connect the said driven member to the said driving member whereby the said members rotate as a unit.

8. The combination of a rotatable driving member, a member to be rotatably driven, means supported upon said driven member and being rotatable relatively thereto, differential transmission mechanism interposed between the said driving member and the said relatively rotatable means, inertia devices, stationary pivots for supporting said inertia devices, means whereby rotation of the said relatively rotatable means actuates the said inertia devices, and means whereby the reactive force exerted by the said inertia devices is transmitted to the said member to be rotatably driven to drive the same.

9. Power transmission mechanism comprising a driving member, a member to be driven, inertia means, differential mechanism interposed between the driving member and the driven member and the said inertia means and means for connecting the said differential mechanism to the said inertia means for operating the latter and for transmitting the resistance offered thereby to the member to be driven, and means for holding said last named means against rotation.

10. Power transmission mechanism of the character described comprising a driving member, a member to be driven, inertia means, differential mechanism interposed between the driving member and the driven member and inertia means, and means for connecting the said differential mechanism to the said inertia means for operating the latter and for transmitting the resistance offered thereby to the member to be driven, said last named means including means for effecting interlocking connection of the member to be driven with the said differential mechanism whereby the latter, the member to be driven and the driving member move as a single unit.

11. Power transmission mechanism of the character described comprising a driving member, a member to be driven, inertia means, differential mechanism interposed between the driving member and the member to be driven and the said inertia means, means for connecting the said differential mechanism to the said inertia means for operating the latter and for transmitting the resistance offered thereby to the member to be driven, said last named means including means for effecting interlocking connection of the member to be driven with the said differential mechanism whereby the latter, the member to be driven and the driving member move as a single unit, and means for holding the said means for connecting the differential mechanism to the said inertia means against rotation.

12. The combination of a rotatable driving member, a member to be rotatably driven, rotatable means supported upon said driven member, differential mechanism interposed between the said driving member and the said rotatable means, inertia devices, means for connecting said rotatable means to said inertia devices for operating the latter whereby the reactive force exerted by the said inertia devices is transmitted to the said member to be driven to drive the same, the said last named means including means for effecting interlocking connection of the driven member and the said differential mechanism whereby the latter, the member to be driven and the driving member rotate as a single unit, and means for holding said connecting means and the said rotatable means against rotation.

13. The combination of a rotatable driving member, a shaft to be driven, a casing for differential transmission mechanism connected to said driving member, a rotatable member connected to said differential mechanism, inertia devices, means for connecting the said rotatable member to said inertia devices for operating the latter whereby the reactionary force exerted by the said devices is transmitted to said shaft to drive the same, the said last named means including speed responsive means for effecting interlocking connection between the said last named means, the shaft to be driven and the said casing whereby the latter, the said shaft and the driving member move as a single unit, and means for holding the means for connecting the said rotatable member to the said inertia devices and the said rotatable member against rotation.

14. The combination of a rotatable driving member, a shaft to be driven, a casing for differential power transmission means connected to said driving member, a rotatable member connected to said differential power transmisson means, inertia devices, means for connecting said rotatable member to said inertia devices for operating the latter and for transmitting the resistance offered thereby to the shaft to be driven, means for connecting said last named means to the shaft to be driven whereby the driving member, the casing and power transmission mechanism and the said shaft move as a single unit, said first named connecting means being adapted to be positioned so that the said shaft will be rotated at a speed relatively greater than that at which the said driving member rotates.

15. The combination of a rotating driving member, a member to be rotatably driven, power transmission means interposed between the said rotating driving member and the said member to be driven the said means including a relatively rotatable element, means adapted to be actuated by the rotation of said element to produce a force of reaction, means whereby the said reactive force may cause rotation of the member to be driven, and speed-responsive means for connecting the said driven member to the said driving member whereby the said members rotate as a unit.

16. The combination of a prime mover, a member to be driven thereby, power transmission means interposed between said said prime mover and the said member the said means including a relatively rotatable member, movable resistance members, means whereby movement of said members alternately in opposite directions is adapted to be effected by the said relatively rotatable element whereby resistance to the rotation of said element is effected by the said resistance members, such resistance varying automatically with the speed of rotation of the said element, means whereby the force of resistance offered by the said resistance members to the said element is transmitted to the member to be driven to drive the same, and speed-responsive means for connecting the said driven member to the said driving member whereby the said members rotate as a unit.

17. The combination of a prime mover, a member to be driven, power transmission means interposed between the said prime mover and the said member, the said means including an element which is relatively rotatable with respect to the said prime mover and the said member, devices which are adapted to be oscillated by the said rotatable element, the oscillation of said devices creating a force of reaction varying in degree with the speed of rotation of the said element which force acts through the said element to drive the said member, and speed responsive means for connecting the said driven member to the said driving member whereby the said members rotate as a unit.

18. Power transmission mechanism of the character described, comprising a driving member, a member to be driven, power transmission means interposed between the two members, the said means including an element rotatable relatively to said members, inertia devices connected to said element whereby the said devices are oscillated by the said element to create a force of reaction which varies with the speed of rotation of the said element, and means interposed between said rotatable element and said members and adapted to have locking connection with said element whereby said force of reaction causes the second-named member to be driven by the first-named member.

19. Power transmission mechanism of the character described, comprising a driving member, a member to be driven, power transmission means interposed between the two members, the said means including an element rotatable relatively to said members, inertia devices connected to said element whereby the said devices are oscillated by the said element to create a force of reaction which varies with the speed of rotation of the said element, said force of reaction causing the second-named member to be driven by the first-named member, and speed-responsive means for connecting the said driven member to the said driving member whereby the said members rotate as a unit.

20. Power transmission mechanism of the character described, comprising a driving member, a driven member, a tubular member mounted upon the said driven member, differential mechanism interposed between the driving member and the said driven member, a portion of the said differential mechanism being supported upon the said driving member and other portions thereof supported respectively upon the said driven member and upon the said tubular member, an element rotatably mounted upon the said tubular member, inertia devices adapted to be actuated by the said element, and means adapted to connect and disconnect the said element to and from the said tubular member whereby the said element and tubular member may be caused to rotate together as a unit or relatively to each other.

21. Power transmission mechanism of the character described, comprising a driving member, a member to be driven, differential mechanism interposed between the said driving member and the member to be driven, a portion of the said differential mechanism being supported by and revolved with the said driving member, a tubular member mounted upon the driven member, one portion of the said differential mechanism being mounted upon the said tubular member and another portion thereof being mounted upon the said driven member, the said two last named portions occupying positions in parallel relation to each other, means mounted upon the said tubular member and adapted to be rotated relatively thereto, inertia devices supported upon stationary pivots and having connection with the said means, and a device adapted to be moved automatically into and out of engagement with the said means whereby the latter may be connected to the said tubular member to rotate therewith or disconnected therefrom to permit relative rotation between the two.

In testimony that I claim the foregoing as my invention I have hereunto signed my name this 9th day of June, 1928.

EDW. C. REID.